Dec. 22, 1942.   O. CONRADTY ET AL   2,306,028
COLLECTOR
Filed Aug. 20, 1940

Inventors
Ottmar Conradty and
Hans Zöllner
By Young, Emery & Thompson
Attorneys

Patented Dec. 22, 1942

2,306,028

UNITED STATES PATENT OFFICE 2,306,028

COLLECTOR

Ottmar Conradty, Rothenbach-on-the-Pegnitz, and Hans Zöllner, Lauf-on-the-Pegnitz, Germany; vested in the Alien Property Custodian Application August 20, 1940, Serial No. 353,418
In Germany April 8, 1939

15 Claims. (Cl. 171—321)

This invention relates to collectors or commutators for electric machines such as motors, generators and the like having collector bars of artificial carbon material to be used with carbon brushes.

In collectors of the type referred to, the conventional materials are so far used for insulating the collector segments from each other and from the supporting body. The insulating layers between the segments consist preferably of mica. The known phenomenon that the mica tends to "grow" beyond the surface of the segments, oftentimes causes considerable disturbances in the function of the brushes, whereby high wear of the same and difficulties in the commutation are produced.

In order to remove these difficulties the method has been adopted of scraping out the mica of the insulating layers to a certain depth and in fact this expedient is indispensable for machines having high circumferential speed of the collector. However, new difficulties are produced with the gaps between the segments scraped out. The collector surface is interrupted at uniform intervals by the incisions between the segments whereby the brushes tend to rattle and breakage of the brushes as well as detrimental reactions upon the carbon segments may be caused and the machine may even be rendered completely inoperative. Moreover, carbon dust is deposited in the gaps between the segments, whereby the segments may be short-circuited and the collectors become electrically inoperative.

It is the object of the present invention to remove these difficulties by the provision of a special insulating material to be inserted as a separating layer between the collector segments.

Figure 1:
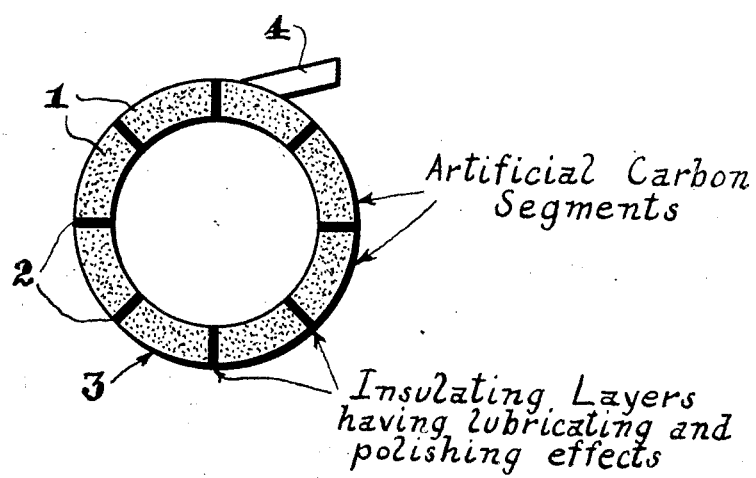
Figure 2:
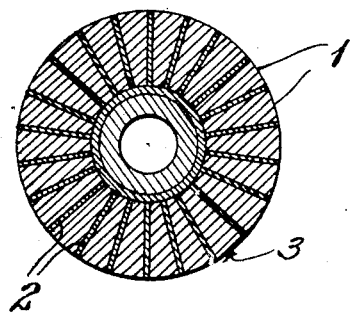

The drawing shows by way of example in Fig. 1 a diagrammatic side view of a commutator for electric motors and generators and in Fig. 2 a cross sectional view of a modified structure. In the drawing 1 indicates the artificial carbon segment and 2 the insulating separating layers. The commutator has a peripheral surface 3 on which the brushes 4 slide, one of which is shown. The brushes may be made of carbon or copper as well as any other suitable material.

According to the invention, the insulating layers between the carbon segments are made of a material which in its wearing properties is very similar to the wearing properties of the artificial carbon of which the segments are made. It has been found by experiments that suitable proportions of non-conductive pulverized materials, such as, talcum and the like when mixed with suitable binders, produced on an artificial resin or artificial glue basis, form an insulating material which meets with the requirements of collectors in a very desirable manner. This insulating material when assembled with the carbon segments to form a collector can be turned or ground to form a smooth cylindrical surface. Also it does not tend to project from the running surface in the course of time, since it is worn off in the same degree as the carbon material and the dust which is developed from this insulating material has no grinding effect upon the collector and the brushes, but it rather acts to cause a polish and lubrication on the surface of the collector. By artificial carbon, is meant a material produced from carbon particles which are compressed into blocks or which may be provided with a binder to hold the particles together.

Our novel collector does not require any scraping out of the insulating material in the gaps between the segments which, of course, is a particular advantage in view of the fact that the artificial carbon segments are easily damaged by the scraping out operation or thereafter, in actual operation. Furthermore, smooth running of the brushes on the uniform and uninterrupted collector surface is ensured and electrical difficulties arising from noisy running of the collector-brush system are also avoided.

The insulating materials to be inserted as insulating layers between the carbon segments may be compressed before their assembly with the carbon segments to form a complete collector, or the material may be pressed, injected or cast between the carbon segments in a plastic, pasty or liquid form and solidified by heating or drying.

By way of alternative, the insulating separating layers between the carbon segments may be made of ceramic substances, cement or gypsum and combined with the carbon segments in the same manner. Furthermore, it has been found that non-combustible insulating substances, such as, for instance, asbestos, compressed under high pressure without any binding additions and impregnated to become flame-proof and water-repellent, may be used as an insulating separating layer between the segments which does not require scraping out, but is worn off in the same degree as the carbon segments, this offering excellent conditions for quiet running and reliable electrical contact between the collector and the brushes.

The method and apparatus of the present invention have been described in detail with reference to specific embodiments. It is to be understood, however, that the invention is not limited by such specific reference but is broader in scope and capable of other embodiments than those specifically described.

We claim:

1. A commutator for electric machines comprising commutator segments of artificial carbon material and insulating separating layers between said segments, said insulating separating layers consisting of a material which is worn off in the same degree as the artificial carbon material and has lubricating and polishing effects with respect to the commutator surface.

2. A commutator for electric machines comprising commutator segments of artificial carbon material and insulating separating layers between said segments, said insulating separating layers consisting of a material which is worn off in the same degree as the artificial carbon material and has a lubricating effect with respect to the commutator surface.

3. A commutator for electric machines comprising commutator segments of artificial carbon material and insulating separating layers between said segments, said insulating separating layers consisting of a material which is worn off in the same degree as the artificial carbon material and has a polishing effect with respect to the commutator surface.

4. A commutator for electric machines comprising commutator segments of artificial carbon material and insulating separating layers between said segments, said insulating separating layers consisting of a mixture of a non-conductive material and a binder which is worn off in the same degree as the artificial carbon material and has a lubricating effect with respect to the commutator surface.

5. A commutator for electric machines comprising commutator segments of artificial carbon material and insulating separating layers between said segments, said insulating separating layers consisting of a mixture of a non-conductive material and an artificial resin binder which is worn off in the same degree as the artificial carbon material and has a lubricating effect with respect to the commutator surface.

6. A commutator for electric machines comprising commutator segments of artificial carbon material and insulating separating layers between said segments, said insulating separating layers consisting of a mixture of a non-conductive material and an artificial glue binder which is worn off in the same degree as the artificial carbon material and has lubricating and polishing effects with respect to the commutator surface.

7. A commutator for electric machines comprising commutator segments of artificial carbon material and insulating separating layers between said segments, said insulating separating layers consisting of a mixture of talcum and a binder which is worn off in the same degree as the artificial carbon material.

8. A commutator for electric machines comprising commutator segments of artificial carbon material and insulating separating layers between said segments, said insulating separating layers consisting of a material of the group comprising ceramic substances, cement, gypsum, which is worn off in the same degree as the artificial carbon material and has a polishing effect with respect to the commutator surface.

9. A method of producing a commutator having artificial carbon segments, comprising the steps of filling up the space between the segments by an insulating material which has the same wearing characteristics as the carbon segments and is introduced in a plastic state, and solidifying said insulating material.

10. A method of producing a commutator having artificial carbon segments, comprising the steps of filling up the space between the segments by an insulating material which has the same wearing characteristics as the carbon segments and is introduced in a plastic state, and solidifying said insulating material by heating.

11. A method of producing a commutator having artificial carbon segments, comprising the steps of filling up the space between the segments by an insulating material which has the same wearing characteristics as the carbon segments and is introduced in a plastic state, and solidifying said insulating material by drying.

12. A method of producing a commutator having artificial carbon segments, comprising the steps of filling up the space between the segments by an insulating material which has the same wearing characteristics as the carbon segments and is introduced in a pasty state, and solidifying said insulating material.

13. A method of producing a commutator having artificial carbon segments, comprising the steps of filling up the space between the segments by an insulating material which has the same wearing characteristics as the carbon segments and is introduced in a liquid state, and solidifying said insulating material.

14. A commutator for electric machines comprising commutator segments of artificial carbon material and a supporting body for said segments being formed integral with the insulating separating layers between said segments and consisting substantially of a material which is worn off in the same degree as the artificial carbon material and has lubricating and polishing effects with respect to the commutator surface.

15. A commutator for electric machines comprising commutator segments of artificial carbon material and insulating separating layers between said segments, said insulating separating layers consisting of asbestos and a flameproof medium and means to render the asbestos water-repellent, said insulating layers having lubricating and polishing effects with respect to the commutator surface.

OTTMAR CONRADTY.
HANS ZÖLLNER.